United States Patent [19]

Koch

[11] Patent Number: 4,956,532
[45] Date of Patent: Sep. 11, 1990

[54] METHOD AND APPARATUS FOR EVEN HEATING OF PRODUCTS BY MEANS OF MICROWAVES

[75] Inventor: Klaus Koch, Laatzen, Fed. Rep. of Germany

[73] Assignee: Hermann Berstorff Maschinenbau GmbH, Hannover, Fed. Rep. of Germany

[21] Appl. No.: 419,218

[22] Filed: Oct. 6, 1989

[30] Foreign Application Priority Data

Oct. 11, 1988 [DE] Fed. Rep. of Germany ....... 3834574

[51] Int. Cl.⁵ ............................ H05B 6/68; H05B 6/78
[52] U.S. Cl. .................... 219/10.55 M; 219/10.55 A; 219/10.55 B; 99/325; 99/451; 426/243; 426/234
[58] Field of Search ............... 219/10.55B, 10.55 A, 219/10.55 E, 10.55 R, 10..55 M, 518, 388; 99/DIG. 14, 451, 325, 443 C; 426/243, 241, 234; 364/477; 340/686, 687; 432/43, 122, 123

[56] References Cited

U.S. PATENT DOCUMENTS

| | | | |
|---|---|---|---|
| 3,699,899 | 10/1972 | Schiffmann et al. | 219/10.55 A X |
| 4,004,138 | 1/1977 | Morooka et al. | 432/51 |
| 4,554,437 | 11/1985 | Wagner et al. | 219/388 |
| 4,624,854 | 11/1986 | Nauman et al. | 219/10.55 M |
| 4,687,895 | 8/1987 | Chitre et al. | 219/10.55 A |
| 4,688,180 | 8/1987 | Motomiya | 364/477 |
| 4,808,782 | 2/1989 | Nakagawa et al. | 219/10.55 M |
| 4,839,485 | 6/1989 | Koch et al. | 219/10.55 A |

FOREIGN PATENT DOCUMENTS 3432341  5/1988  Fed. Rep. of Germany .

Primary Examiner—Philip H. Leung
Attorney, Agent, or Firm—Foley & Lardner, Schwartz, Jeffery, Schwaab, Mack, Blumenthal & Evans

[57] ABSTRACT

A method and apparatus for even and rapid heating, pasteurization or sterilization of products contained in a package, such as, for example, pharmaceutical products or food, which are conveyed through a microwave treatment chamber on a continuous conveyor belt. In order to heat components of the products having different heat absorption for the purpose of reaching the pasteurization temperature rapidly and evenly, the temperature of the components is recorded by a temperature sensor, and on the basis of this the computer calculates the respective $\Delta T$, taking into account given product parameters and the desired temperature to be reached. When the product passes under the following input aperture, a given microwave energy level is coupled into each specific component, as a result of which an even temperature of all products in the package is achieved very rapidly without overheating of the product.

9 Claims, 2 Drawing Sheets

METHOD AND APPARATUS FOR EVEN HEATING OF PRODUCTS BY MEANS OF MICROWAVES

BACKGROUND OF THE INVENTION

The invention relates as indicated to a method and apparatus for producing even heating of products by microwaves, and is particularly useful in the heating of food products.

Apparatus for pasteurizing by means of microwaves is known from German Patent No. 3,432,341. There is disclosed therein an oblong microwave treatment chamber with a continuous conveyor belt passing through the chamber. Microwave input channels are led into the treatment chamber and temperature probes are arranged. By means of this apparatus, a step-by-step reduction of the microwave energy to be input is carried out in each case in three successive chambers. If the product to be treated, for example a ready meal, is to be subjected to a pasteurizing operation, the achievement of an even temperature for all of the various components contained in the package is of great importance. It is very difficult to meet this demand, because the individual products, for example different pharmaceutical or food products, have a different heat requirement for reaching an even temperature.

In prior art methods, the temperature of the product was taken as a criterion which the treatment temperature, for example the pasteurization temperature, had first reached. The upper treatment temperature was the maximum, critical temperature which it was not permitted to exceed, in order to avoid temperature-caused damage. The remaining products contained in the package, for example gravy, consequently did not reach the pasteurization temperature at all, because a further increase of the overall temperature which would have been necessary for pasteurizing the gravy would have necessarily led to damage to the other products.

SUMMARY OF THE INVENTION

The object of the invention is to provide a method and apparatus for achieving a very even temperature of the individual products to be treated in a container or in a closed package. For example, the present invention makes it possible in a packaged ready meal to bring to an even temperature very quickly both the vegetables requiring or absorbing less energy as well as a piece of meat in gravy, and maintain such even temperature thereafter.

The exact position of the packages on the conveyor belt is determined before entry into the treatment chamber by any suitable means, for example, by a motion pickup interacting with a reflection light barrier. The position information is transmitted to a computer, so that an energy output can be carried out by means of the computer control of the microwave generators when the packages on the conveyor belt run under and/or over microwave input channels.

By virtue of the arrangement of temperature sensors which determine the temperature of the individual products in the package, the method of operation according to the invention makes it possible to take into account each individual component of the product as regards the microwave input. For this purpose, specific product parameters for controlling the generators determining the energy level must be inputted into the computer.

In the pasteurization of a ready meal in accordance with the invention, the temperature of the potatoes for example, contained first in the direction of travel of the package is measured and transmitted to the computer. After this, the temperature of the piece of meat, for example, which follows next in the package is measured, and this is also forwarded to the computer. Finally, the temperature of a third portion, for example, a vegetable portion, following thereafter in the direction of travel is measured and forwarded.

The portion weight, material density and dielectric values of the potatoes, meat, gravy, and vegetable, as well as the even end pasteurization temperature for all products, is input beforehand into the computer.

The computer then determines the respective microwave energy level which is required to, for example, heat up the potatoes from 43° C. to 80° C., the piece of meat from 60° C. to 80° C. and the vegetables from 30° C. to 80° C.

When the package on the running conveyor belt passes the microwave input aperture of the input channels, the respective microwave energy level is input exactly into the associated product to achieve the final treatment temperature of 80° C. The microwave energy is input into the associated product as a result of the individual generator being controlled by the computer when the product passes the input aperture of the respective input channel.

In order to provide verification with products which are difficult to heat up, following this it is possible to carry out a renewed contactless temperature measurement of the individual products when the package is led past on the conveyor belt under or over the temperature sensor arranged after the input channel.

The increased temperatures resulting from the calculated microwave energy, which temperatures rise at different rates depending on the product to be treated, are measured again and transmitted to the computer.

The computer again calculates the microwave energy level which is required before the individual products reach the final treatment temperature and instructs the individual generators to input a correspondingly corrected energy level into each individual product.

This operation is repeated at each input channel. In front of each channel in the working or traveling direction is a temperature sensor arranged at a given distance and connected to the computer. This process is continued until the final treatment temperature is reached.

Depending on the requirements, the package or also an open container is then kept warm for a given time and transported out of the treatment chamber.

BRIEF DESCRIPTION OF THE DRAWINGS

Preferred exemplary embodiments of the invention are explained below with reference to the drawings, in which.

DETAILED DESCRIPTION OF THE PREFERRED EMBODIMENTS

Figure 1:
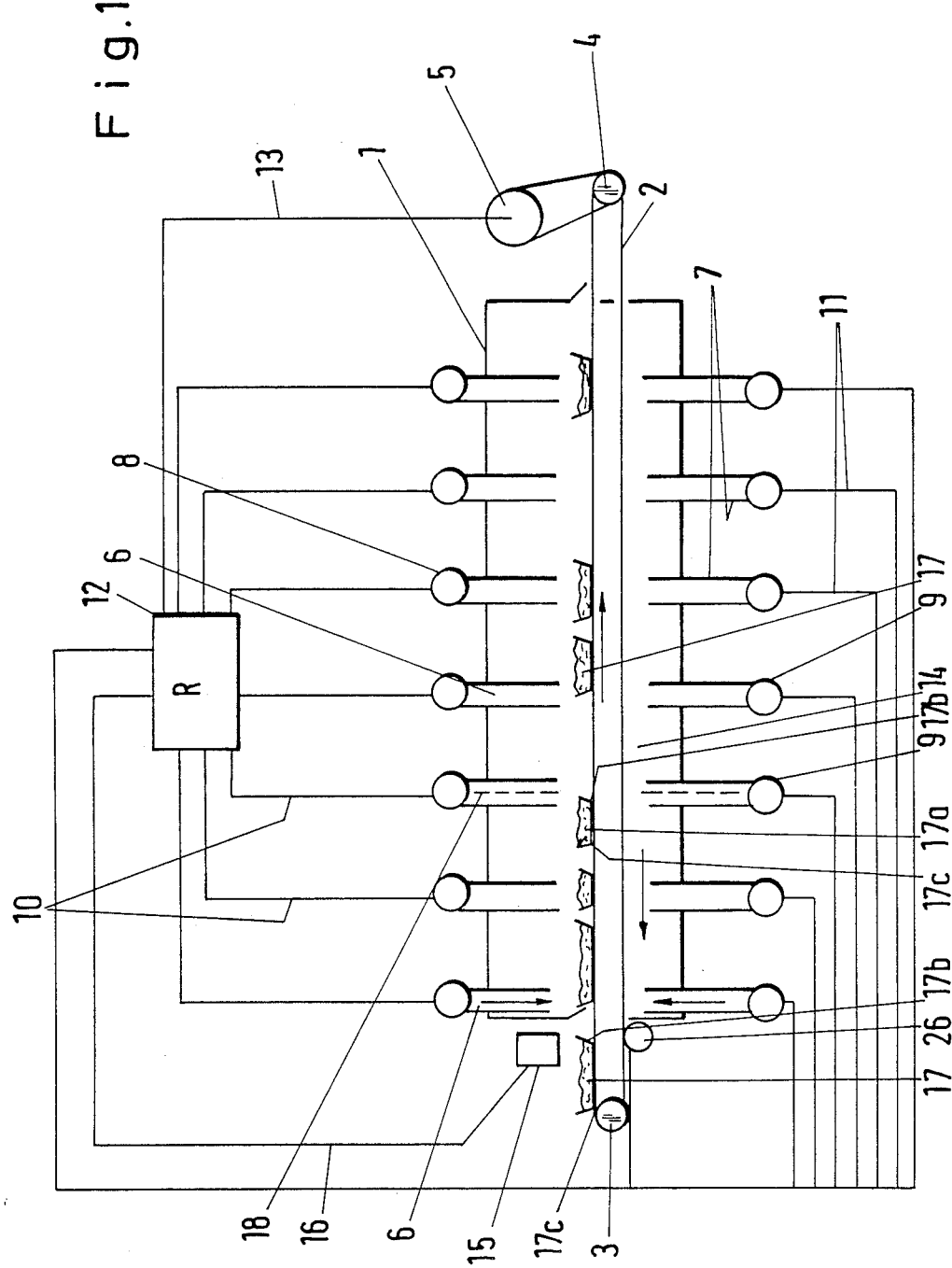
FIG. 1 shows a diagrammatic longitudinal section through the microwave apparatus of the present invention.

A continuous conveyor belt 2 is led through the treatment chamber 1 and guided around the rollers 3 and 4. A drive 5 for the belts is connected to the guide roller 4, and by line 13 to a computer 12.

Opening into the treatment chamber are upper microwave input channels 6 and lower microwave input channels 7, to which respective upper generators 8 and lower generators 9 are connected for generating microwave energy.

The upper generators 8 are connected via the lines 10 and the lower generators 9 are connected via the lines 11 to the computer 12.

For the purpose of registering the exact positions of the container 17 on the conveyor belt 2, a reflection light barrier 15 is provided which is connected via the line 16 to the computer 12. The barrier 15 is connected to a generally known motion pickup 26 also connected to the computer. The position of the package 17a on the conveyor belt 2, in particular the beginning 17b and the end 17c, is recorded by the registering device 15 and transmitted to the computer 12.

The motion pickup 26 of the registering device converts the belt movement into electrical pulses, which can be dimensioned such that, for example, one pulse is transmitted to the computer per millimeter of belt movement. With this resolution, the switching points for switching-on and switching-off the microwave energy can be defined precisely to the millimeter with respect to the container length and the aperture center 18 of each input channel.

In the course of the exact registration of the beginning 17b and of the end 17c, the computer 12 calculates the switch-on and switch-off points 23 and 24 (See FIG. 2) of the microwave energy in relation to the container position on the belt.

When the package 17a, for example, travels under the aperture center 18 of the input channel 6, the computer 12 switches the microwave energy on. The microwave input is switched on based on the calculation of the path travelled by the package 17 with the conveyor belt 2 to place the food components under the aperture center 18 of the input channel 6.

When the switch-off point 24 passes under the aperture center 18, the microwave output from channel 6 is switched off by the computer 12.

The operation described is carried out without any need to sense the beginning 17b or end 17c of the package in the chamber 1. The computer calculates in each case the exact time of the beginning and the ending of the microwave output for each individual channel 6, 7 for each individual package and for each individual product component in the package, solely on the basis of the registration of the position of the package 17 on the conveyor belt 2 before entry into the treatment chamber. The immovable arrangement of the input channels 6 and the distances between them are likewise taken into account by the computer 12, as well as the speed of the conveyor passing through the treatment chamber 1.

Figure 2:
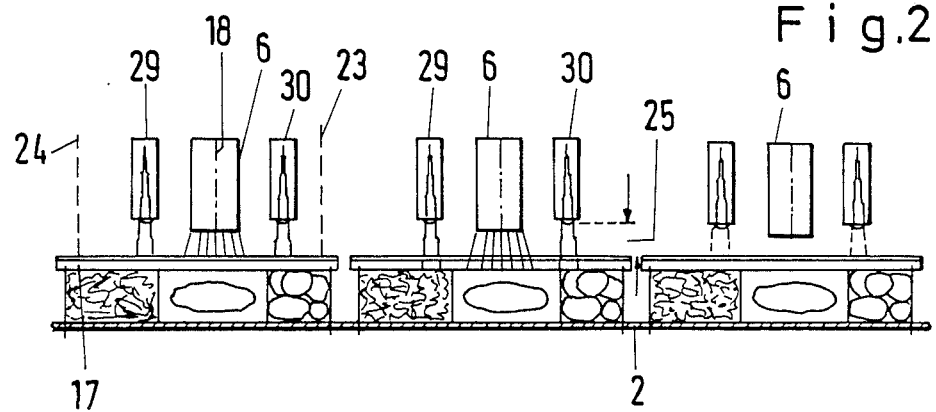
FIG. 2 diagrammatically shows the sequence of energy input into the individual components of the products.

In accordance with the invention, the temperature of the individual product components in the packages may be measured by temperature sensors, for example, infrared sensors 29 and 30 (FIG. 2). The infrared sensors 29, which are not shown in FIG. 1, are arranged in each case before each lower and upper microwave input channel 7, 6. If appropriate, sensors 30 may also be arranged after the input channels in order to measure the temperature again after microwave treatments, so as to have this information available for control purposes.

Figure 3:
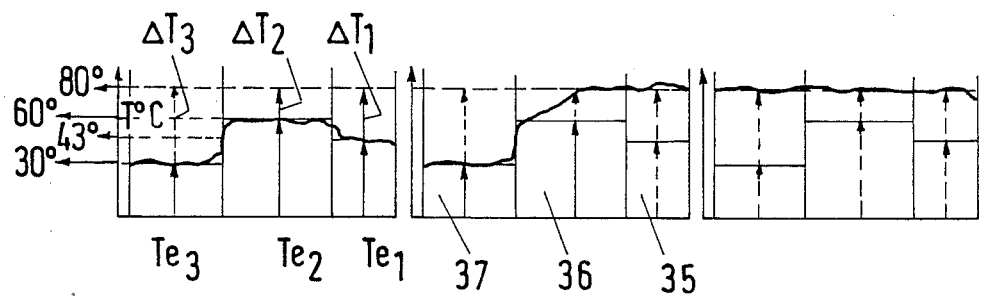
FIG. 3 graphically illustrates the temperature increase of the package of FIG. 2, before, during and after the microwave treatment.

FIG. 3 shows a microwave energy profile which is drawn under and synchronized with FIG. 2, and which indicates the temperature of the respective components or portions of the products in each package. In the package 17 shown in FIG. 2, the food product comprises a potato portion 35, a meat portion 36 and a vegetable portion 37. During the first temperature measurement of the three portions, the values shown at the left in FIG. 3, exactly below the portions shown in FIG. 2, were obtained:

| | |
|---|---|
| vegetables 37 | 30° C. |
| meat 36 | 60° C. |
| potatoes 35 | 43° C. |

On the basis of these values recorded by a temperature sensor, the computer calculates the energy level for the input channel following the sensor in the working direction for controlling the output energy of the generator connected to the input channel.

The computer operates as follows. The temperature signals $Te_1$ for the potato temperature
$Te_2$ for the meat temperature
$Te_3$ for the vegetable temperature are transmitted by the temperature sensor to the computer 12 and are first offset against the required output temperature (T = 80° C.) to obtain the temperature difference.

The resulting ΔT signal (80° C.–30° C. for vegetables) is subjected to a further arithmetic operation which calculates the parameters specific to this vegetable, such as portion weight, density, and dielectric values, for determining the microwave energy level required for this vegetable portion, and transmits this information to the generator controller. The microwave energy level required is specified as a percentage of the installed generator power Δ% P (correction factor in percent of 1.2 kW). This then yields for the potatoes for = $\Delta T_1$ a power $P_1$ of 60% of 1.2 kW generator power, the meat for a $\Delta T_2$ a power $P_2$ of 100% of 1.2 kW generator power, the vegetables for a $\Delta T_3$ a power $P_3$ of 50% of 1.2 kW generator power.

Represented in the middle part in FIG. 3 is the temperature increase which results after the microwave input caused by the next energy input point at the microwave input channels 6 and/or 7.

Figure 4:
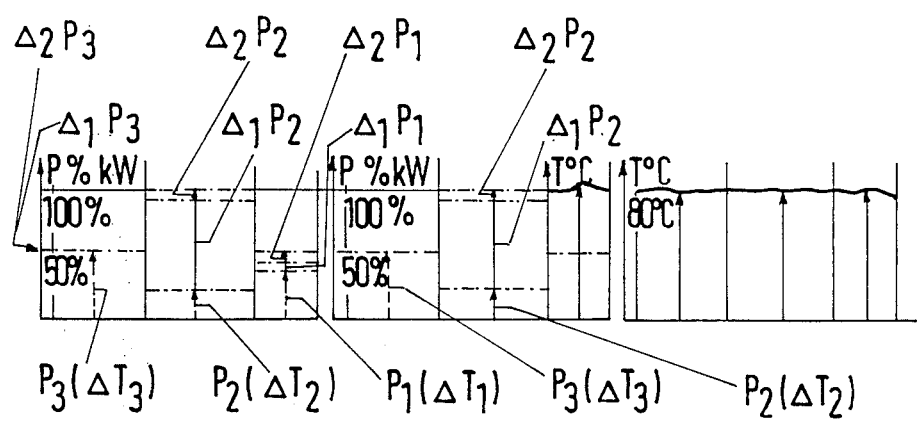
FIG. 4 graphically illustrates the energy level to be inputted in order to reach the final temperature.

In FIG. 4, the $\Delta T_1$ to $\Delta T_3$ values are stated as converted percentages of the generator power, required to reach the final treatment temperature.

The next temperature recording is carried out in an analogous manner to the above described measurement operation by a temperature sensor which is arranged in front of the following input channel at a given distance, taken into account by the computer.

The energy required to be inputted after the first temperature adjustment phase is significantly lower, reference being made to the middle graph of FIG. 3. The final temperature of the potato portion 35 has already been reached. It is only necessary now to increase the temperature of the meat portion 36 (to a limited extent) and the vegetable portion (to a greater extent). By means of additional microwave energy, which takes into account the product-specific data (weight, density, dielectric values) ($\Delta P_1$ to $\Delta P_3$), the final temperature is reached. In this case, $\Delta P_3$ is zero percent, $\Delta P_2$ is 10 and $\Delta P_1$ is also 10 percent (kW percentage of the generator power).

By means of a renewed temperature measurement and calculation of the supplementary $\Delta T$ value by the computer, as well as a corresponding control of the generator power, the final temperature is then maintained in each case.

The final temperature may be reached in numerous single steps by inputting a respective partial energy output, or also in a few steps. The reaching of the temperature can be made dependent on the respective product or on the product composition in the individual packages or open containers.

Since $\Delta T$ of the individual products varies greatly, it is advantageous to carry out the temperature measurement after the package has passed a microwave input channel in the direction of travel, so that the computer can incorporate these values when calculating the necessary energy level input.

EXAMPLE

There was placed into the food package made of a deep-drawn and sealed plastics foil a preprepared dish made of potatoes, meat and vegetables, which was to be subjected to a pasteurizing operation in order to destroy bacteria to prolong the time the product remains fit for consumption or storage.

Each package had the following dimensions:
Length: 180 mm
Width: 140 mm
Height: 40 mm
Weight: 350 g.

The input temperatures of the various components were as follows:

| | |
|---|---|
| potatoes | 43° C., |
| piece of meat | 60° C., |
| vegetable portion | 30° C., |

These temperatures were recorded by the sensor 29 preceding the input channel 6 shown at the left in FIG. 2. When passing under the sensor an energy input is carried out
of 40% for the potato portion $\Delta_1 P_1$,
of 90% for the meat portion $\Delta_1 P_2$, and
of 50% for the vegetable portion $\Delta_1 P_3$.

At the temperature measurement by the next temperature sensor 29 in the direction of travel, the temperature increases for the various portions were as follows:

| | |
|---|---|
| potato portion | from 43° C. to 78° C., |
| meat portion | from 60° C. to 75° C., and |
| vegetable portion | from 30° C. to 80° C. |

On the basis of these newly measured values, the following amounts were calculated by the computer to be coupled into the product components at the following input channel 6:

| | | |
|---|---|---|
| potato portion | +20% | (generator power), ($\Delta_2 P$) |
| meat and gravy portion | +10% | (generator power), ($\Delta_2 P_3$) |
| vegetable portion | +0% | (generator power), ($\Delta_2 P_1$) |
| (desired vegetable temperature has already been reached). | | |

The next temperature measurement confirmed that all three product components had been brought to almost exactly the same pasteurization temperature without the product in the package suffering any damage, or the package bursting as a result of too high a temperature. The energy amount used was also lower overall.

In this manner, the $\Delta P$ values, which take account of the product-specific data, can be automatically recorded and processed in the operation (closed-loop control system).

If operation is without the second infrared probe 30, the factors which determine the $\Delta P$ must be established by means of individual measurements and manually entered in the computer for further processing.

The input channels 6, 7 are preferably adjustable toward and away from the surface of the products, with the preferred position of adjustment being such that the microwave output opening of each channel is dimensioned so as to be equal to or less than one wavelength of the microwave energy employed, for example 120 mm at 2450 mHz.

What is claimed is:

1. A method for the even heating of different products by means of microwave energy, in which the products to be treated are passed on a conveyor belt through a microwave treatment chamber and are contained in either open containers or closed packages permeable to microwave energy supplied by microwave input channels longitudinally spaced along the conveyor belt, comprising the steps of:
   (a) registering the beginning and end positions of each container before or during initial entry into the treatment chamber, and transmitting the registration information to a computer,
   (b) measuring the temperature of the individual products prior to microwave heating, and transmitting the temperature information to said computer,
   (c) creating a microwave energy profile from the measured temperature and from specific product parameters,
   (d) inputting microwave energy into each product, according to the profile, at a first station following said temperature measurement,
   (e) measuring the surface temperature of each product following step (d), and transmitting such temperature information to the computer,
   (f) re-determining the microwave energy profile for each product, based on the last measured temperature and the given specific product parameters,
   (g) inputting microwave energy into each product according to the re-determined profile as it passes under the next succeeding input channel, and,
   (h) repeating the temperature measurement and microwave input steps until the product has reach its desired, even temperature throughout.

2. The method of claim 1, wherein said treatment chamber is oblong and said conveyor belt is operated continuously.

3. The method of claim 1, wherein input channels are positioned above and below said conveyor belt and extend through the walls of said treatment chamber, said input channels being operatively connected to microwave generators switched on and off by said computer.

4. The method of claim 1, further including the steps of sensing the temperature of said products immediately before and after each passes said input channels.

5. The method of claim 1, further including the steps of adjusting the distance of the output of each microwave input channel from the products so that the output opening is dimensioned so as to be equal to or less than one wavelength of the microwave energy employed.

6. The method of claim 1, further comprising the steps of selecting an output temperature for all of the products in a container or package, passing said products through said first station, offsetting the subsequently measured temperatures of said products from said desired output temperature to obtain a temperature difference, determining the microwave energy level required for each of said products as a percentage of the generator power, talking into account the parameters specific to each product, applying microwave energy to said products at a second location, recording the temperature of said treated products following each application of microwave energy, and continuing such process until the difference between the required output temperature of all products is zero.

7. An apparatus for the even heating of products by means of microwave energy, in which the products to be heated are passed on a conveyor belt through a microwave treatment chamber and are contained in open containers or closed packages permeable to microwave energy supplied by microwave input channels longitudinally spaced along the conveyor belt, comprising:

means for registering the position on said conveyor of the beginning and the end of each container before or during its initial entry into the treatment chamber, a computer, and means for transferring the position registration information to said computer, means for measuring the temperature of each product prior to microwave energy treatment, and means for transmitting the temperature information to said computer, said computer comparing such temperatures with parameters specific to the product, and means for providing microwave energy, including microwave input channels positioned in longitudinal spaced relation, to provide a series of treatment stations, and microwave generators associated with each of said input channels, said microwave generators being activated and deactivated by said computer to provide selected levels of microwave energy dependent upon the product passing below said input channel, and wherein said means for measuring the temperature comprises temperature sensors positioned at least in advance of each input channel and projecting vertically into the treatment chamber, the temperatures sensed being transmitted to said computer for determining microwave energy levels to be applied to said product through the associated input channel.

8. The apparatus of claim 7, further including a temperature sensor arranged in the working direction of said conveyor immediately after each microwave input channel, so as to provide more complete temperature information to said computer for subsequent adjustment of microwave energy levels.

9. The apparatus of claim 7, wherein each input channel is provided with a microwave output opening adjacent the product, and means for adjusting the output opening toward or away from the product, said adjusting means functioning to position said output opening at a distance from the product equal to or less than one wavelength of the microwave energy employed.

* * * * *